Aug. 5, 1924.

H. A. MORTON ET AL 1,503,701

PATCH AND METHOD OF MAKING THE SAME

Filed May 14, 1921

Inventors:
Harold A. Morton,
Marion M. Harrison,
by Spear Middleton Donaldson & Hall
Attys.

Patented Aug. 5, 1924.

1,503,701

UNITED STATES PATENT OFFICE.

HAROLD A. MORTON AND MARION M. HARRISON, OF AKRON, OHIO, ASSIGNORS TO THE MILLER RUBBER COMPANY, OF AKRON, OHIO, A CORPORATION OF OHIO.

PATCH AND METHOD OF MAKING THE SAME.

Application filed May 14, 1921. Serial No. 469,469.

*To all whom it may concern:*

Be it known that we, HAROLD A. MORTON and MARION M. HARRISON, citizens of the United States, and residents of Akron, in the county of Summit and State of Ohio, have invented certain new and useful Improvements in Patches and Methods of Making the Same, of which the following is a specification.

Our present invention relates to improvements in patching material designed for patching or repairing punctured inner tubes of vehicle tires and the like, and the invention aims to provide patching material which will possess ample elasticity to make it suitable for application to the elastic inner tubes, and which will retain for an indefinite period the necessary characteristics or condition which will enable it to be effectively used as a patching medium.

The invention further aims to provide patching material of laminated nature in which the laminations will be permanently united and yet possess a surface layer of unvulcanized material which will remain permanently unvulcanized, so that upon application of a suitable solvent a cement will be formed on the surface of the patch capable of adhering to the tube to be repaired.

With these and other objects in view, the invention comprises the novel patching material and method of forming the same hereinafter described and particularily defined by the appended claims.

Our invention is illustrated in the accompanying drawing, in which—

Figure 1:
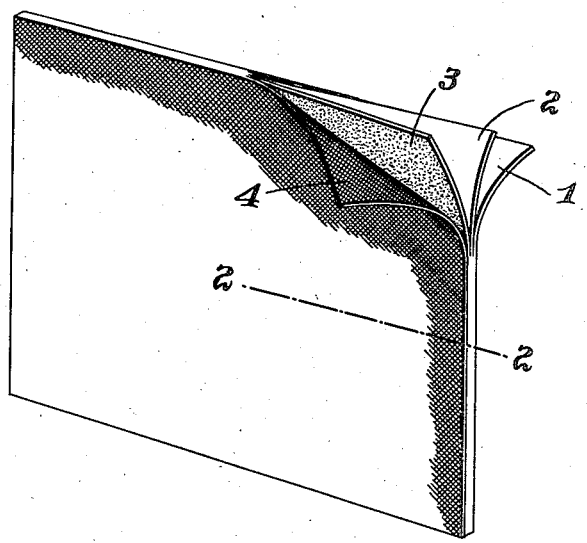
Figure 2:
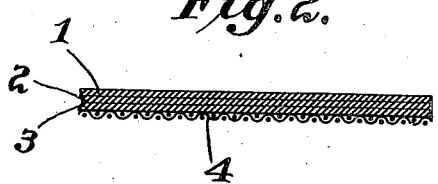

Figure 1 is a plan view partly broken away showing a strip of patching material, and Fig. 2 is a section on line 2—2 of Fig. 1.

Our improved patching material is preferably manufactured in sheet form and of a size sufficient to enable a number of patches to be cut therefrom of the varying sizes according to the size of the puncture to be repaired, and such a sheet is shown in the accompanying drawing, but it will be obvious that the size of the sheet is immaterial, and if desired, might be in the shape of individual patches instead of a larger sheet from which individual patches are to be cut.

Our improved patching material comprises a laminated sheet composed of three layers of rubber stock of an aggregate thickness corresponding to the thickness of the desired patch. One of these layers is made from a rubber compound containing sulphur, another from a rubber compound containing an organic accelerator, and the third from a rubber stock containing neither sulphur nor accelerator. The sulphur and accelerator containing layers are superimposed one upon the other, and the third layer is applied to the surface of one of the first mentioned layers, preferably upon the layer containing the accelerator, as shown in Fig. 1, in which the numeral 1 designates the sulphur containing layer, the numeral 2 the accelerator containing layer, and the numeral 3 the layer containing neither sulphur nor accelerator. A layer of holland cloth 4 is applied to the exposed surface of the third layer where it remains until the patch is used.

The layers 1, 2 and 3 are vulcanized together so as to be permanently united, and hence incapable of becoming separated, no matter how long or under what conditions the patch is maintained, or used, but the layer 3 being unvulcanized except at the point of junction with the layer 2.

In the manufacture of our improved patch, we form the layer 1 by the use of any suitable rubber mixing apparatus, and calender, not necessary to be shown herein, from a rubber compound containing sulphur but no accelerator, and the layer 2 in a similar manner from a rubber compound containing an accelerator, but no sulphur.

Assuming the layers 1 and 2 to be of approximately equal thickness, which is preferable, the layer 1 would contain an amount of sulphur necessary to effect the vulcanization of a sheet of aggregate thickness of layers 1 and 2, but no more, while similarly the sheet 2 would contain a quantity of accelerator capable of coacting with the sulphur to effect the vulcanization of the sheet of aggregate thickness of layers 1 and 2. The layer 3 is then applied to the surface of one of the layers 1 or 2 and the protective fabric 4 placed over the exposed surface of the layer 3. Thereafter the composite sheet is subjected to a temperature sufficiently high to effect vulcanization and under the action of the increased temperature the sulphur and accelerator migrate, so that they interact to effect the vulcanization of the two layers 1 and 2 and their firm union, and also unite the surface of the layer 3 to one of the aforesaid layers by vulcanization without such vulcanization affecting the body of the layer 3. It will be understood that proportions of sulphur and accelerator are so selected that vulcanization takes place at a low or what may be termed "room" temperature. The proportions of sulphur and accelerator being only sufficient to effect the vulcanization of the layers 1 and 2 and the vulcanization thereof to the surface of the layer 3, it will be apparent that there is no possibility for the body of the layer 3 to become vulcanized, and it will therefore remain in its unvulcanized condition, so that upon the stripping off of the protective muslin and the application of the solvent, such as gasoline, thereto, the necessary cementing surface will be formed for adhering to the tube to be patched.

For example, if the layer 3 is superimposed upon the accelerator carrying layer, it will be apparent that accelerator alone cannot migrate into the layer 3 to effect vulcanization of the latter, which could only take place by the presence of sulphur, but as the sulphur containing layer is separated from the layer 3 by the accelerator bearing portion, the sulphur would have to migrate through the intervening layer to reach the layer 3, but by the time it has migrated through the intermediate layer, it has been completely combined with the rubber or acted upon thereby, so that there is no free sulphur left to act upon the third layer. Similarly, if the sulphur bearing layer is located between the third layer and the accelerator the presence of the sulphur adjoining the third layer could not affect it, as the lower heat used will not enable layer 3 to vulcanize in the presence of sulphur alone, the action of the accelerator being necessary, and this must migrate through the intervening strip, and by the time it has so migrated and reached the surface of the third layer, it has been completely used up.

We have found that by the process above described we can secure a patch which possesses ample elasticity, one in which the layers are firmly united together by vulcanization, and one in which the surface layer will be of unvulcanized material, which condition it will retain indefinitely or in other words, it will not be liable to become subsequently vulcanized or hardened, and we thereby avoid serious objections which have been found to patches heretofore produced of which we are aware.

Examples of layers which we have found satisfactory are as follows:

The sulphur-containing layer may consist of the following compound:

Smoked sheets _____ 73.75
Sulphur _____ 1.25
Lithophone _____ 20.00
Zinc oxide _____ 5.00

The accelerator-containing layer may be composed of:

Smoked sheets _____ 74.25
Lithophone _____ 20.00
Zinc oxide _____ 5.00
Dimethyl amine addition
 product with carbon disulphide _____ 0.75

The uncured layer may consist of:

Smoked sheets _____ 75.00
Lithophone _____ 25.00

The patch formed by superimposing the three above layers may be cured for twenty-four hours at 60° C.

Having thus described our invention what we claim is:

1. The hereindescribed method of forming a sheet of patching material which consists in superimposing on each other a plurality of layers of rubber compound, one outer layer containing neither sulphur nor accelerator, the other layers containing respectively an accelerator and sulphur, the proportion of sulphur and accelerator being balanced so as to be just sufficient to effect vulcanization of said last two layers and their union by vulcanization to the first named layer, leaving said first named layer unvulcanized, and thereafter effecting such vulcanization.

2. The hereindescribed method of forming a sheet of patching material which consists in superimposing on each other a plurality of layers of rubber compound, one outer layer containing neither sulphur nor accelerator, an intermediate layer containing an accelerator, and the other outer layer containing sulphur, and thereafter effecting the vulcanization of the last two layers and their union by vulcanization to the first named layer.

3. A laminated sheet of patching material comprising a layer of rubber compound containing sulphur but no accelerator, a layer of rubber compound containing accelerator but no sulphur, and a layer of rubber compound containing neither sulphur nor accelerator, assembled in the order named and subjected to heat at a temperature less than that necessary to vulcanize the first named layer.

4. A laminated sheet of patching material comprising a layer of rubber compound containing neither sulphur nor accelerator, a layer containing sulphur, an intermediate layer, containing accelerator but no sulphur and acting to prevent sulphur from migrating from the second named layer to the first named layer when the assembled layers are subjected to vulcanizing heat.

In testimony whereof, we affix our signatures.

HAROLD A. MORTON.
MARION M. HARRISON.